United States Patent [19]
Bayer

[11] Patent Number: 6,084,442
[45] Date of Patent: Jul. 4, 2000

[54] DIGITAL OSCILLATOR FOR GENERATING TWO FIXED PULSE SIGNALS FROM ONE CLOCK

[75] Inventor: Johannes Bayer, Altdorf, Germany

[73] Assignee: Lucent Technologies Inc., Murray Hill, N.J.

[21] Appl. No.: 09/073,285

[22] Filed: May 6, 1998

[30] Foreign Application Priority Data

May 9, 1997 [DE] Germany .......................... 197 19 547

[51] Int. Cl.[7] ................................................. H03B 21/00

[52] U.S. Cl. ........................... 327/107; 327/49; 327/166; 327/176; 327/298

[58] Field of Search .................................... 327/105, 107, 327/113, 115, 117, 165, 166, 172, 176, 291, 99, 39, 40, 43, 47, 49, 298; 377/47, 48; 331/49

[56] References Cited

U.S. PATENT DOCUMENTS

| | | | |
|---|---|---|---|
| 4,547,751 | 10/1985 | Nakata et al. | 332/100 |
| 5,136,180 | 8/1992 | Caviasca et al. | 327/115 |
| 5,817,949 | 10/1998 | Brown | 73/861.28 |

*Primary Examiner*—Timothy P. Callahan
*Assistant Examiner*—Minh Nguyen

[57] ABSTRACT

In order to use a digital oscillator to generate a target frequency ZT with a "high" or "low" level constant in time from a working clock by variable division by a first division factor, two divider circuits which can be respectively triggered by the positive or the negative edges of a working clock, and to which a control word can be directed alternately by means of a first controlled switch, and which are connected on their output sides to a second controlled switch to obtain a clock pulse. To that end each divider circuit has a logic module which detects the occurrence of the edge of the control word and stores this event, with this event triggering a division by a second division factor.

6 Claims, 4 Drawing Sheets

DIGITAL OSCILLATOR FOR GENERATING TWO FIXED PULSE SIGNALS FROM ONE CLOCK

BACKGROUND OF THE INVENTION

1. Field of the Invention

The invention relates to a digital oscillator, especially for a desynchronizer within a transmission system.

2. Description of the Prior Art

In principle it is possible for a digital oscillator to be constructed of a number of n dividers with n different division ratios, which, on one hand, are connected with a quartz [crystal oscillator] for the generation of the basic frequency to be divided, and, on the other hand, connected to a multiplexer. The multiplexer is so triggered that, for a desired target frequency, there is switching to that divider which supplies it. This, in turn, can be taken off at the multiplexer. The triggering occurs, e.g., via a control into which the digital oscillator is incorporated.

Within a message transmission system the digital oscillator serves to generate a plesiochronous frequency, of, for example, 2.048 MHz, 34.368 MHz, or 44.736 MHz as target frequency. In addition, it is a part of a desynchronizer, which in urn forms the interface between the synchronous and the plesiochronous clock domains within the transmission system. Two signals are plesiochronous if their bit rates are indeed nominally equal, yet in fact are able to diverge within a given tolerance from the nominal value. The desynchronizer thus serves among other things for taking the plesiochronous 2 Mbit/s, 34 Mbit/s or 45 Mbit/s clock from a data signal.

A desynchronizer of a transmission system, e.g. one known from EP 0 404 268 A2, comprises a buffer memory, a writing address counter, a reading address counter, and a filter, connected on the output side to a digital oscillator, especially an NCO (numerically controlled oscillator). The clock is generated in a digital phase-locked loop (PLL) regulating circuit which comprises the filter and the NCO. On the input side, the filter is connected to the writing address counter and to the reading address counter. The filter issues a control signal for the NCO which is working in principle as a divider, and which creates the desired target frequency from a base or input frequency through division.

An essential requirement of such an NCO or digital oscillator is that the time [duration] of the "high" level of the generated clock, i.e. of the target frequency, be constant. In such a case this clock can be used to generate an HDB3 pulse as specified according to CCITT Recommendation G 703 for 34 Mbit/s or 45 Mbit/s, without the possibility that a quantization of the digital oscillator could have a negative influence on the pulse generation. According to this specification the duration of a positive or negative pulse of such an HDB3 signal clock must not exceed or fall below a specific tolerance.

SUMMARY OF THE INVENTION

Thus it is the purpose of the invention to indicate a digital oscillator for the generation of a PLESIOCHRONOUS frequency of about 34 MHz or of about 45 MHz from one working clock (base frequency) with which, along with a simple circuitry, the duration of the "low" level of the generated clock (target frequency) is constant, whereby alternatively the level of the "high" level is also constant. Furthermore, there is to be indicated a method for generating the plesiochronous frequency within a desynchronizer of a transmission system by means of such a digital oscillator.

With regard to the digital oscillator this problem is solved, according to the invention, using a digital oscillator that is a dual edge clocked numerically controlled oscillator (NCO) which generates the desired target frequency, i.e the plesiochronous frequency, by variable division of a working clock, i.e. by variable division of the base frequency.

To that end two divider circuits are provided, which can be triggered alternately by a control word, so that the rising as well as the falling edge of the working clock are utilized. This offers the essential advantage that for the generation of the target frequency of about 34 MHz or about 45 MHz, the frequency of the working clock needs to amount to merely, for example, about 550 MHz. With this, realization is possible with available ASIC technology. In addition, the power loss at half the frequency is only half as great.

In order to also obtain at the same time a constant level of the generated clock (target frequency), each divider circuit comprises a logic module which detects the appearance of a mainly rising edge of the control word and which stores this event. This event triggers at each divider circuit a division by means of a second division factor, but only when the current (first) division factor has been finished with. During the division by the second division factor a switch over occurs to the respective other divider circuit.

At that the invention starts from the consideration that a target clock of about 34 MHz or about 45 MHz with constant "high" or "low" level can be generated from a working clock of relatively low and therefore realizable base frequency through variable division, if on one hand both edges of the working clock pulse are used, and if on the other hand, the present division or counting by means of a preferred division factor is not interrupted at the appearance of a pulse edge of a control signal. The invariance in time of the target clock level can then be achieved by targeted switching over between two divider circuits that are clocked by the two edges of the working clock.

The switching between the two synchronously operating divider circuits occurs suitably by means of a control circuit which operates both switches, depending on the counter state of the divider circuit connected at the time. To that end the first switch, at the input side, determines that divider circuit to which the control word, preferably a 1 bit control word, is conducted. By means of the second switch, located at the output side, it is determined which divider circuit is generating the target clock at the time.

The divider circuits and the control circuit are synchronized to one another, especially at the onset of operation. To that end the reset inputs of the divider circuits and the control circuit are connected to one another. If the second divider circuit is clocked with the negative edge of the working clock, that latter starts both divider circuits, at the onset of operation, with a time delay of one half period. To this end the second divider circuit receives the inverted working clock, so that a falling edge as perceived by the first divider circuit is perceived as a rising edge by the second divider circuit. The realization occurs suitably by means of an inverter connected to the clock input of the second divider circuit. This has the advantage that both divider circuits are constructed identically. Alternatively the second divider circuit can also have an inverted clock input.

The logic module assigned to each of the two divider circuits is functionally a detection component and a storage component as well as a counter component. In its function as detection component the logic module is suitably connected to the output of a (first) bistable element having both a control word input as well as a clock input, the bistable element being a part of the divider circuit. Thus it is possible to feed the logic component with the control word directly, as well as time delayed by the clock frequency.

In its function as storage component, the logic module is connected to a (second) bistable element which also has a clock input, with the input of the bistable element being connected to the output of the logic module and the output being connected to the input. In its function as a divider or counter component the logic module is connected to an arrangement of a number of, preferably four, (third) bistable elements, each having a clock input, with their inputs being connected to the corresponding outputs of the logic module and their outputs being connected to the corresponding inputs of the logic module.

Each and every bistable element is suitably a flip-flop. A clock source can be directly connected to the clock inputs of the bistable elements. Yet it is also possible for a clock signal derived by division to be connected to each clock input of the bistable elements. Also each bistable element can be clocked with a signal that depends on this clock source. At that, the clock frequency corresponds to the base frequency.

For creating the control word it is preferred to generate, from an n-bit word, n>1, a 1-bit control word from a control signal, which is generated e.g. in the filter of a desynchronizer. A corresponding control circuit can also be partially realized within the filter of a desynchronizer.

The advantages obtained through the invention consists especially in the fact that by means of a dual edge clocked digital oscillator with a logic module being functionally a detection and memory component for a clock edge of a control signal, as well as a counter component, it is possible to generate from a base frequency a target frequency with constant "high" or "low" level. Thus the digital oscillator can be applied advantageously to create the plesiochronous clock frequency of about 34 MHz or about 45 MHz from simply realizable, high frequency working clock of about 550 MHz. Thus on one hand, the produced clock, because of its "high" or "low" level, which is constant in time, is particularly advantageous for the generation of the HDB3 pulse required according to CCITT G.703 within a transmission system. On the other hand, the generated self jitter is very low and dependent on parameters such as the supply voltage and the chip temperature.

The oscillator can be fully realized digitally and can thus be integrated monolithically, so that, compared to a hitherto customary discrete, analog realization by means of a VXCO (Voltage Controlled Oscillator), an essentially more favorably priced production is possible.

BRIEF DESCRIPTION OF THE DRAWINGS

In the following, examples of execution of the invention are explained in detail, based on a diagram. There are shown in.

Mutually corresponding parts are indicated in all figures by the same reference symbols.

DETAILED DESCRIPTION OF THE INVENTION

Figure 1:
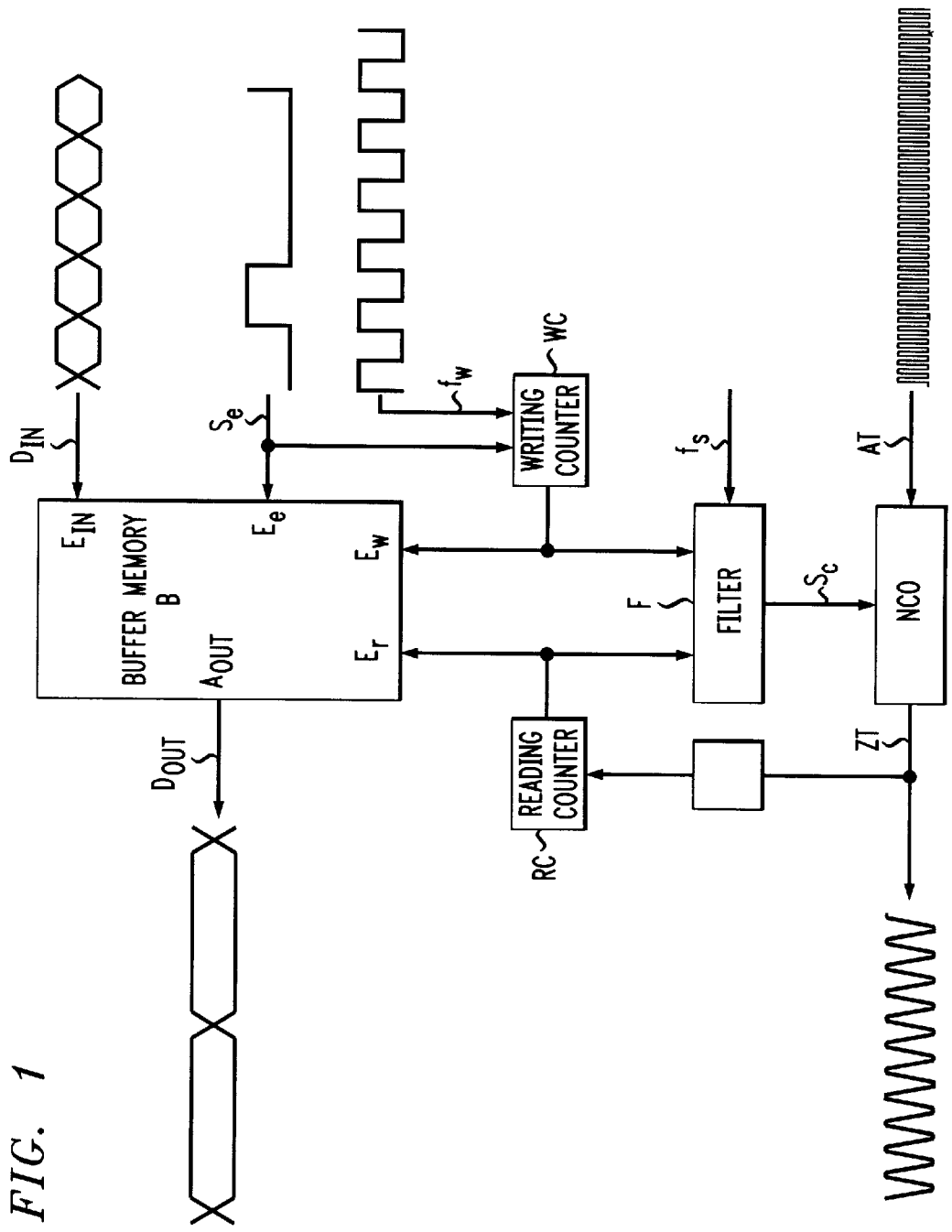
FIG. 1 is schematically a desynchronizing circuit with a digital oscillator (NCO)

FIG. 1 shows a desynchronizer with a buffer memory or buffer B, with a writing and a reading address counter WC and RC respectively, and with a filter F, after which is connected a numerically controlled digital oscillator, referred to in the following as an NCO (numeric controlled oscillator). The write address counter WC indicates that address to which a data byte $D_{in}$, read-in via a data input $E_{in}$ of the buffer B, is to be written. The buffer B further features a data output $A_{out}$ for bytewise readout of the data $D_{out}$. Buffer B further has a "write enable" input $E_e$, via which an "enable" signal $S_e$ is conducted to the buffer B and to the writing address counter WC. Additionally, the buffer B comprises inputs $E_w$ and $E_r$ for the writing address counter WC and the reading address counter RC, respectively. Conducted to the writing address counter WC is a writing clock $f_w$ with a clock frequency (write clock) of about 19.44 MHz.

The buffer B takes in the input data $D_{in}$ if the enable signal $S_e$ is "high" or logical "1". A valid data byte $D_{in}$ at the data input $E_{in}$ will thus be indicated by an active enable-signal $S_e$. All valid data bytes $D_{in}$ are written into the buffer B. After the writing-in of a valid input signal or data byte $D_{in}$ into the buffer B, the writing address counter WC is incremented by one location. The data input $E_{in}$ of the buffer B, which is at the same time the data input of the desynchronizer, is thus synchronous with the writing clock $f_w$ by which the writing address counter WC is clocked.

The data $D_{out}$ read out of the buffer B are synchronous with e.g. a fraction of the plesiochronous clock signal or read clock with a frequency of 34.368 MHz or 44.736 MHz, which will, in the following, be called the target frequency ZT. After every clock cycle, the read address is advanced or incremented by one location. The desynchronizer serves for the regeneration of the plesiochronous 34 MBit/s or 45 Mbit/s clock and for the extraction of the data of a signal transmitted in the synchronous digital hierarchy.

In the filter F connected after the writing and reading address counters WC and RC, the level of the buffer B is contained, which is determined on the basis of the difference between writing and reading counters WC and RC respectively. By means of the filter F, periodically appearing gaps are prevented from effecting a triggering of the NCO. For the processing of the digital signals within the filter F, this latter requires a clock frequency $f_s$ (sampling clock) of, in the example of execution, 5.726602 MHz. The filter F generates a control signal $S_c$ for the NCO.

The control word $S_W$ for the NCO is on one hand a 1 bit word On the other hand, the distance between two rising edges of the control word SW is greater or equal to one counter period, for example greater or equal to two counter periods. For the NCO within the desynchronizer the content of the buffer B must be taken into account as well, which content is processed in filter F and which forms the real control quantity for the NCO. The control signal (control) $S_e$ generated therefrom in the filter F is an n bit word with n>1. The 1 bit control word SW is then generated from this control signal SC.

Figure 2:
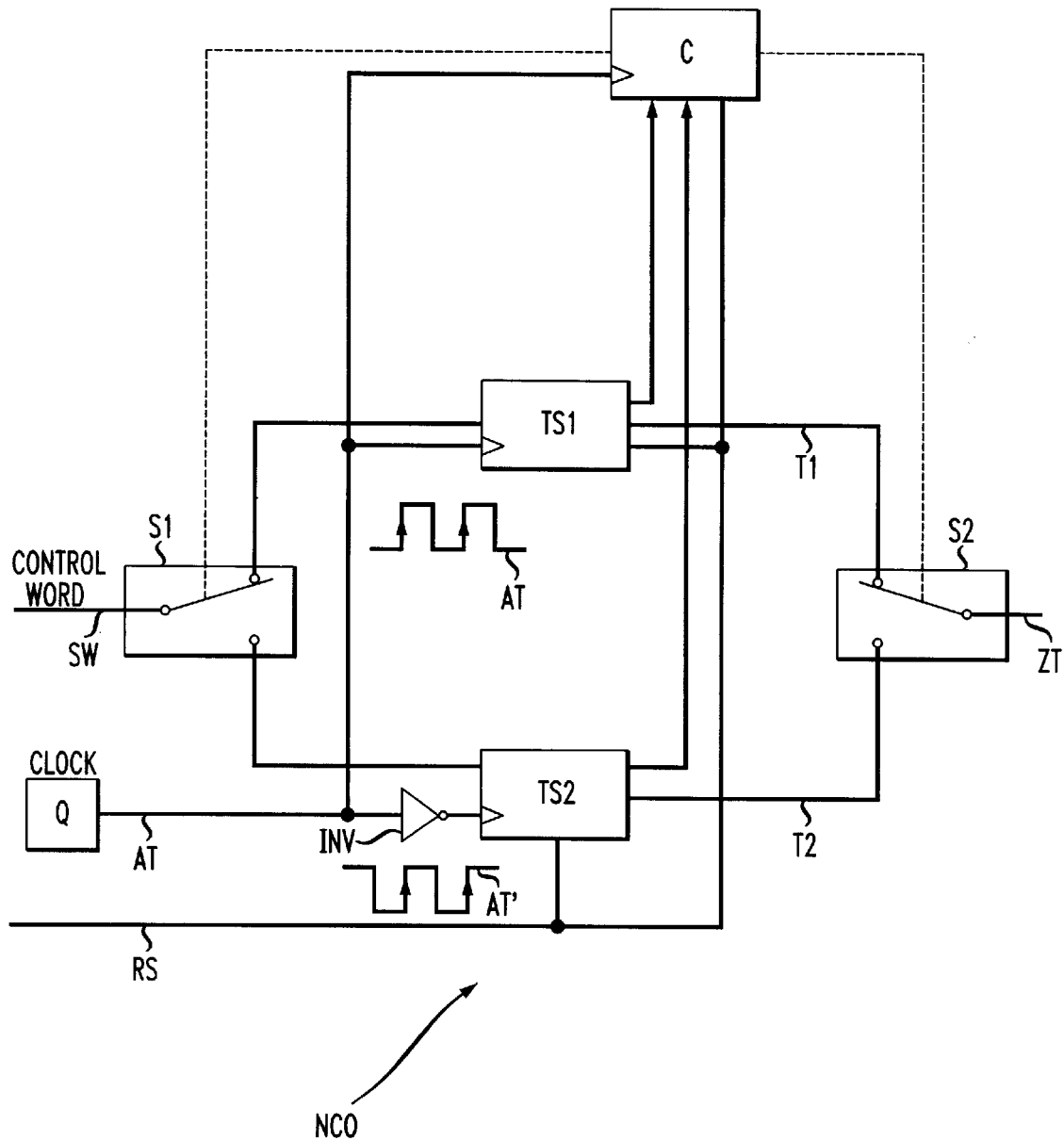
FIG. 2 is the digital oscillator according to FIG. 1 with two controlled switchable over divider circuits and with one control circuit.

The dual edge clocked digital oscillator NCO is shown in FIG. 2. It is constructed of two controlled switchable-over variable divider circuits by means of which the working clock AT, generated in the example of execution by a quartz [oscillator] Q as clock source, having a base frequency (local clock) of preferably 550 MHz (FIG. 1), is divided down. At that the NCO is triggered by means of the control word SW.

The oscillator NCO comprises two divider circuits TS1 and TS2 as well as two switches S1 and S2 which are activated by a common control circuit C. In the example of execution the first divider circuit TS1 is clocked from the positive edge of the working clock AT, while the second divider circuit TS2 is clocked from the negative edge of the working clock AT. This is illustrated in FIG. 2 by the clock pulse trains AT or AT' shown below the clock inputs of the divider circuits TS1, TS2. To this end an inverter INV is connected to the clock input of the second divider circuit TS2. The control word SW is alternately directed to both divider circuits TS1 and TS2 via the first switch S1.

The divider circuits TS1 and TS2 yield, as divider specific output clocks T1 or T2, the working clocks AT or AT' divided by a first division factor N or a second division (N−1). If at the control input of the divider circuit TS1 or TS2 a positive edge of the control word SW has occurred, then according to the illustrated switch position in the divider circuit TS1, connected according to the shown switch position, a division by (N−1) is carried out. Otherwise, a division by N occurs, with, in the example of execution, N=16.

Figure 3:
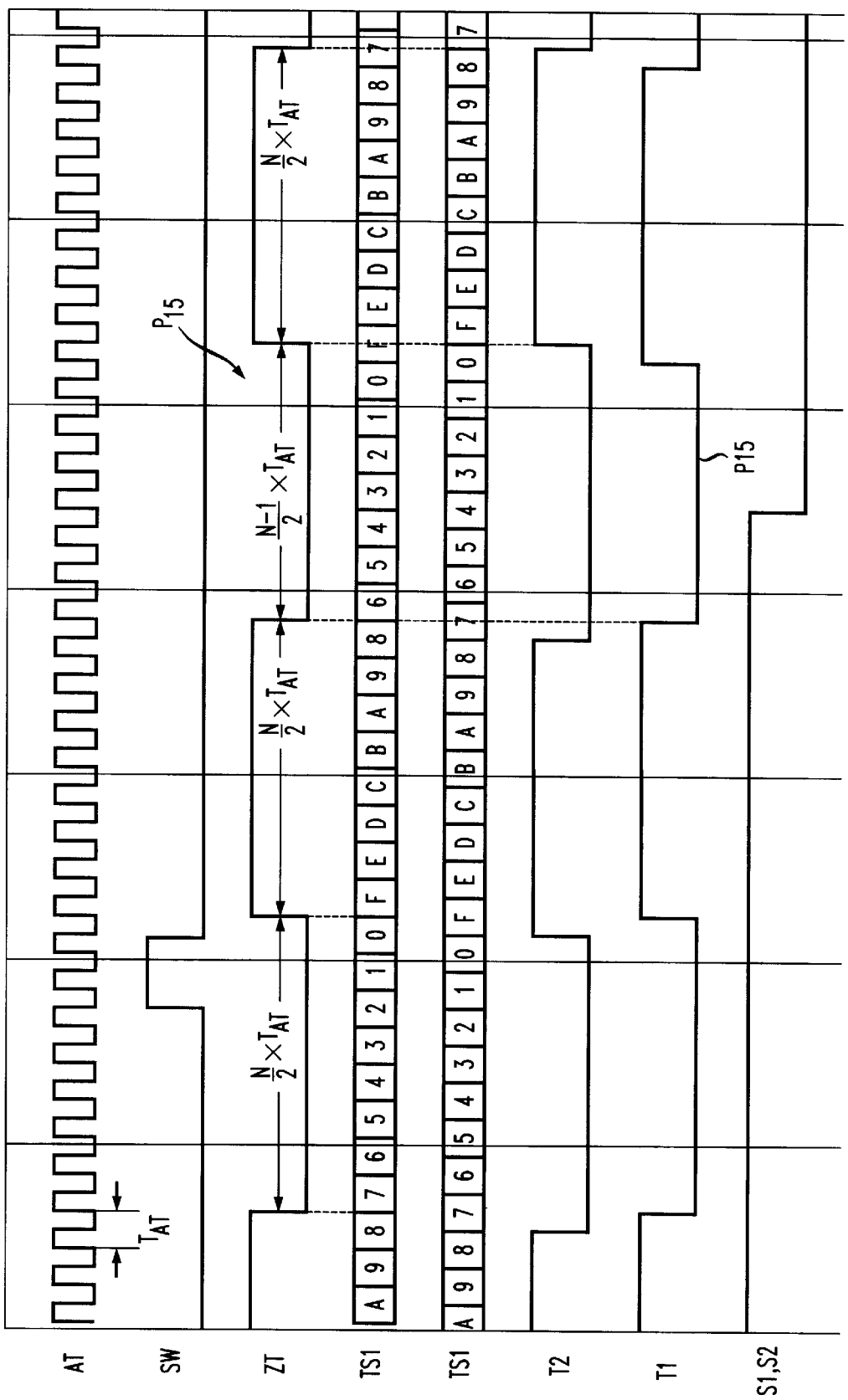
FIG. 3 is in a signal diagram, the generation of a target clock (target frequency) from a working clock (base frequency)

As can be seen based on the corresponding signal courses in FIG. 3, the switchover from the first divider circuit to the second divider circuit occurs during the division by (N−1) through counting down from hexadecimal "15" (F) to 0. At that the switching-over occurs in such a way that for the target clock Zr the falling edge—here at the counter value "7"—of the output clock T1 of the first divider circuit TS1 is still used, while the rising edge of this pulse is already applied by the output clock T2 generated by the second divider circuit TS2 for the target clock ZT.

At that, the control word SW is switched alternately by the switch S1 to the first divider circuit TS1 or to the second divider circuit TS2. By the second, output side switch S2 it is determined which of the two divider circuits TS1, TS2 directly generates the target clock ZT. Control of the switches S1 and S2 occurs via the control circuit C which, in order to fix the instant of switchover, is connected to each of the divider circuits TS1 and TS2. Divider circuits TS1 and TS2 as well as the control circuit are synchronized with one another in order to begin operation or else if one of these components falls out of step.

To generate the output clocks T1 and T2 and with that to generate the target clock ZT, the working clock AT or the inverted working clock AT' are divided down variably, where normally a division by N=16 occurs. To generate the exact target clock ZT of 34.368 MHz the working clock is divided K=127 times by N=16 and subsequently one time by (N−1)=15. To that end the divider circuits TS1 and TS2, each activated by the switch S1—and with that the NCO— receive at their inputs the control word SW, the pulse/pause ratio of which determines the number of divisions by N=16 and the required divisions by (N−1)=15. The more frequently a division by (N−1)=15 occurs, the higher is the generated frequency of the target clock ZT. On the other hand, the generated frequency of the target clock ZT is lower the more often a division by N=16 occurs. At the appearance of a rising edge of the control word SW this event is stored. The subsequent division is a division by (N−1)=15. During this division by (N−1) switchover to the other respective divider circuit occurs. After this division the stored event is erased.

As a result, the 34 MHz or 45 MHz clock is created with a required deviation within an offsetting of 1 20 ppm, with its "low" level being constant in time. Analogously it is also possible to keep the "high" level constant in time. In other words: Through storage of the event of the appearance of each and every rising edge of the control signal it is achieved that first the current division is terminated before, subsequently, division by the smaller of the two division factors N and (N−1) occurs. This division by (N−1) means a shortening of the following "low" level. The "high" level following this is—just as the preceding "high" level— constant in time. This is illustrated in FIG. 3, with the shortened "low" level being marked $P_{15}$.

Figure 4:
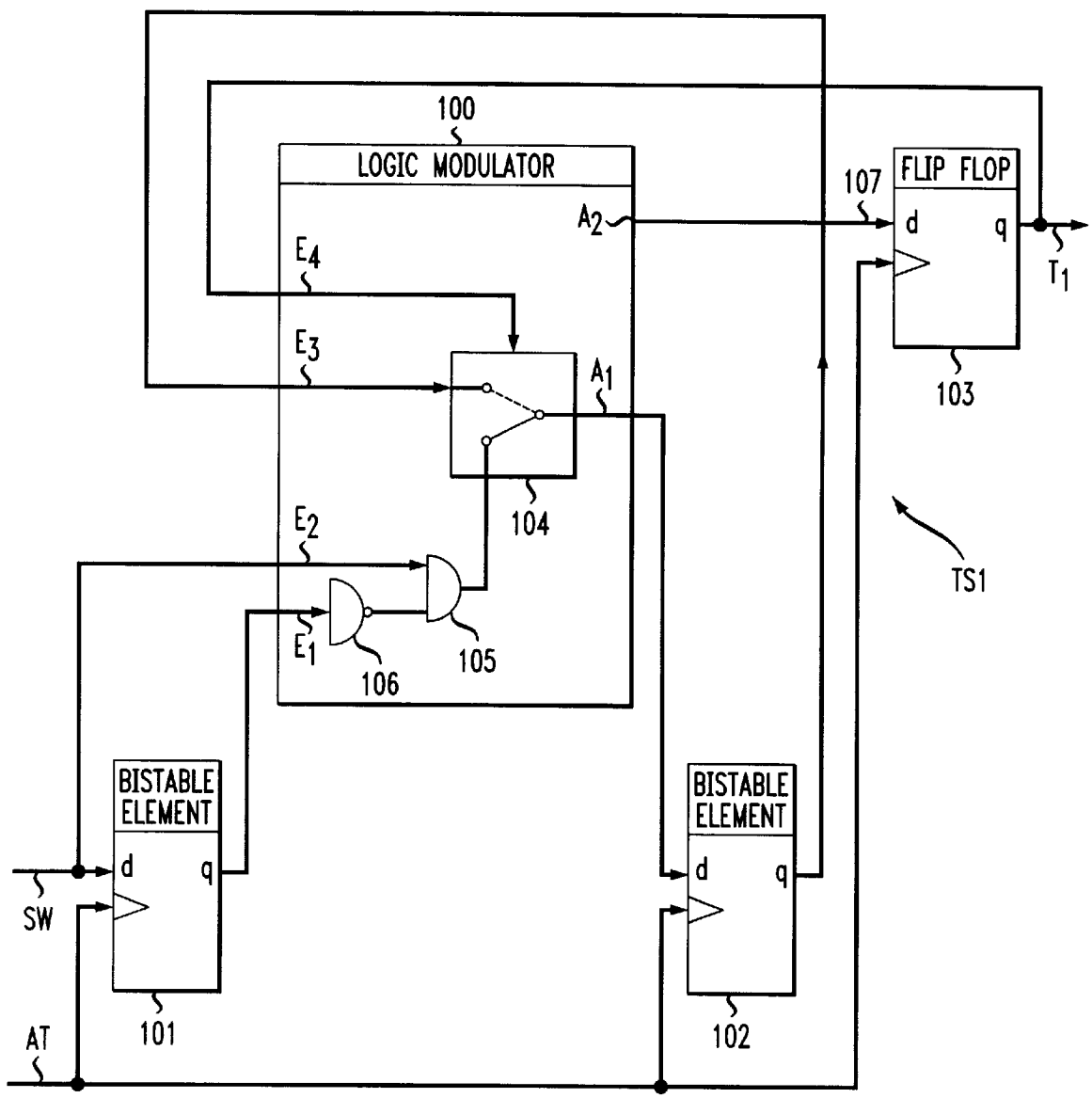
FIG. 4 is a logic component of the divider circuits of the oscillator according to FIG. 2.

The divider circuits are constructed identically, so that the following, based on FIG. 4, the functioning of the first divider circuit TS1 is explained representatively. This latter comprises as essential constituent a logic module 100, which in its function as detection component is connected to a first flip-flop 101. The d-input of this flip-flop 101 is connected to an input $E_2$ of the logic module 100, while the q-output of the flip-flop 101 is connected to an input $E_1$ of the logic module 100.

In its function as memory component the logic module 100 further is connected to a second bistable element 102, which is likewise executed in the form of a flip-flop. The q-output of this flip-flop 102 is connected to an input $E_3$ of the logic module 100, while the d-input of the flip-flop 102 is connected to a first output $A_1$ of the logic module 100.

In its function as a counter/divider component the logic module 100 connected to a third bistable element 103, with n=4 flip-flops being provided to realize a division ratio of $2^n$=N =16 in the example of execution. Each and every flip-flop 103 has its d-input connected to a second output $A_2$ of the logic module 100. The q-output of each and every flip-flop 103 is connected to an input $E_4$ of the logic module 100. The working clock AT is sent to the clock inputs of flip-flops 101, 102, and 103. Analogously the inverted working clock AT' is sent to these flip-flops of the second divider circuit TS2.

Partial functions standing out in logic module 100 are a switchover device 104 as well as a logical AND-element 105, to one input of which an inverter 106 is connected. The drive of the logic module 100 occurs through the control word SW contiguous at the same time to the d-input of flip-flop 11. For triggering it the rising edge of a pulse or clock of the control word SW is brought in. The detection of a rising edge of the triggering signal or control word SW occurs by means of the flip-flop 101, the q output of which is connected, via the input E and the inverter 106, to the AND-element 105. Furthermore, the control word SW is conducted via the input $E_2$ directly to the AND element 105.

If the d-input of the flip-flop 101 and its q-output are "low" or logical "0", then a logical "1" is impressed because of the inversion of the AND element 105, and its corresponding input is "high". Furthermore, the "0" from the d-input of the flip-flop 101 is conducted to the AND element 105. With the rising edge of the control word SW a logical "1" is impressed on this input of the AND element 105, so that the output of the AND-element 105 is "high", even though the q-output of the flip-flop 101 is still "low" at this point in time. As soon as, with the next clock AT of the flip-flop 101, the "1" at the d-input is impressed on the q-output, because of the inversion the other input of the "AND" element 105 becomes "low", so that the output of the AND element 105 changes to the "low" state. Yet previously the state "1" was at the output of the AND element 105, and with that the event of the appearance of the rising edge of the control word SW was stored. As a corresponding algorithm the following applies:

if $E_2$=1, and $E_1$ =0, then set this event=1;

otherwise set this rising edge event=0.

The storage of the rising edge event and with that the "1" due to the AND logic occurs within the logic module 100 via the switchover device 104, one position of which is connected to the AND element 105, and the other position of which is connected to the input $E_3$ of the logic module 100. The switchover device 104 is therewith connected through its [logic module 100's] output $A_1$ to the d-input of flip-flop 102. In the depicted switch position of switchover device 104 this state "1" is conducted from the output of AND element 105 to the d-input of flip-flop 102, so that with the next clock [pulse] AT the q-output of flip-flop 102 takes on this state or input value "1". Via the feedback from the q-output of flip-flop 102 to the input $E_3$ of logic module 100 the switchover device 104 will be set to the position marked by the dotted line. In this position the event will be stored. During the dotted line switch position a division by (N−1)= 15 occurs. After the ensuing division the event is erased and the switchover device 104 is set to the indicated position.

For the division by (N−1)=15 the corresponding algorithm applies:

If $E_3$ =1 and $E_4$=8, then
set $A_2$=6 and $A_1$=0.

With reference to FIG. 3 this means that the counting—starting from the counter value q=F=15 down to the counter value q=0—occurs downward, with the counter value q=7 being skipped, and the counter value q=6 being put directly into this position. In addition, $A_1$=0 is set if $A_2$ =6 and no further rising edge has appeared in control word SW. With the next working clock [pulse] AT to flip-flop 112, the input $E_3$=0 is set likewise, and the event is erased.

For the division by N=16 the corresponding algorithm applies:

If $E_4$=0 then set $A_2$=F; otherwise set $A_2$=$E_4$−1.

For the division by N=16 the inputs are $E_3$=0 and $E_4$=F= 15. This means that the counting proceeds downwards starting from the counter value q=F=15 down to the counter value q=0. When the counter value q=0 is reached, the input $E_4$ is set to q=F. During the counting down—until the counter value q=0 is reached—the counter value at the input $E_4$ is reduced each time by one. In other words: at the counter value q (e.g. q=9) the input $E_4$ is set to q−1 (thus to q−1=8).

Thus the logic module 100 in its function as division component is a counter. A division by $2^n$ requires n flip-flops. The division is realized by combining the counter or logic module 100 with four flip-flops 103, because the maximum division by N=16 =$2^4$ requires four binary positions. This means that four lines 107 are to be provided at the output $A_2$ of the logic module 100, with one respective line 107 going to each of the four flip-flops 103. These thus represent in sum the numerical values in binary from q=0 to q=15. The result of the division, i.e. the target frequency ZT the target clock of 34.368 MHz or 44.736 MHz, including the offset, can be obtained at the second switch S2.

Reference Symbol List

| | |
|---|---|
| B | Buffer |
| RC | Read address counter |
| WC | Write address counter |
| NCO | Oscillator |
| F | Filter |
| A | Output |
| E | Input |
| D | Data |
| $S_e$ | Enable signal |
| $S_c$ | Control signal |
| $f_w$ | Writing clock |
| $f_s$ | Clock frequency |
| TS1,2 | Divider circuit |
| S1,2 | Switch |
| C | Control circuit |
| INV | Inverter |
| Q | Clock source |
| AT | Working clock/Base frequency |
| ZT | Target clock/frequency |
| SW | Control word |
| RS | Reset signal |
| N | First division factor |
| N-1 | Second division factor |
| $P_{15}$ | Level |
| 100 | Logic module |
| 101,102,103 | Flip-flop |
| 104 | Switchover device |
| 105 | AND element |
| 106 | Inverter |
| 107 | Conductors |

What is claimed is:

1. A digital oscillator for generation of a target clock signal by dividing a working clock signal where each pulse has a positive going edge and a negative going edge, comprising: a first divider circuit which is clocked by the positive going edge of the working clock signal and divides the working clock signal by a first division factor; a second divider circuit which is clocked by the negative going edge of the working clock sign and divides the working clock signal by a second division factor; a first controlled switch which alternately directs a control word to the first and second divider circuits; a second controlled switch that alternately selects an output of the first and second divider circuits to form the target clock signal; each divider circuit having a logic module which detects occurrence of the edge of the control word and stores this event, with this event triggering a division by the second division factor and a common control circuit coupled to the first and second divider circuits and the first and second controlled switches to synchronize the operation of the divider circuits with the controlled switches.

2. The digital oscillator of claim 1, comprising an inverter coupled to the second divider circuit to convert the negative going edge of the working clock signal to the positive going edge.

3. The digital oscillator of claim 1 wherein the control word directed by the first controlled switch to the first and second divider circuits comprises a single bit.

4. The digital oscillator of claim 1 wherein the first and second divider circuits and the common control circuit are coupled to a common clock source.

5. The digital oscillator of claim 1 wherein the first and second divider circuits and the common control circuit are coupled to receive a common reset signal.

6. The digital oscillator of claim 1 wherein each divider circuit comprises a logic module; a first bistable element having an input terminal coupled to receive the control word and an output terminal coupled to a first input terminal of the logic module; a second bistable element having an input terminal coupled to receive a signal from a first output terminal of the logic module and an output terminal coupled to a third input terminal of the logic module; and a third bistable element having an input terminal coupled to a second output terminal of the logic module and an output terminal coupled to a fourth input terminal of the logic module.

* * * * *